United States Patent
Jagadeeshwaran et al.

(10) Patent No.: US 10,129,331 B2
(45) Date of Patent: Nov. 13, 2018

(54) LOAD BALANCING USING A CLIENT SWAPPING OPERATION

(71) Applicant: VMWARE, INC., Palo Alto, CA (US)

(72) Inventors: Adarsh Jagadeeshwaran, Bangalore (IN); Sai Inabattini, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 91 days.

(21) Appl. No.: 14/825,193

(22) Filed: Aug. 13, 2015

(65) Prior Publication Data

US 2016/0381125 A1   Dec. 29, 2016

(30) Foreign Application Priority Data

Jun. 25, 2015 (IN) .......................... 3208/CHE/2015

(51) Int. Cl.
*G06F 15/173* (2006.01)
*H04L 29/08* (2006.01)

(52) U.S. Cl.
CPC ...... *H04L 67/1002* (2013.01); *H04L 67/1095* (2013.01)

(58) Field of Classification Search
CPC . H04L 67/1002; H04L 67/1095; H04L 29/08; G06F 9/4856
See application file for complete search history.

(56) References Cited

U.S. PATENT DOCUMENTS

| | | | | |
|---|---|---|---|---|
| 8,352,942 | B2* | 1/2013 | Shimogawa | G06F 9/4856 718/1 |
| 8,370,592 | B1* | 2/2013 | Specht | G06F 11/3034 707/661 |
| 2005/0251802 | A1* | 11/2005 | Bozek | G06F 9/5077 718/1 |
| 2010/0293146 | A1* | 11/2010 | Bonnet | G06F 9/455 707/640 |
| 2011/0119427 | A1* | 5/2011 | Dow | G06F 9/5088 711/6 |
| 2014/0019974 | A1* | 1/2014 | Siu | G06F 9/4856 718/1 |
| 2014/0040892 | A1* | 2/2014 | Baset | G06F 9/455 718/1 |
| 2014/0196037 | A1* | 7/2014 | Gopalan | G06F 9/4856 718/1 |

* cited by examiner

*Primary Examiner* — Cheikh Ndiaye
(74) *Attorney, Agent, or Firm* — Loza & Loza, LLP

(57) ABSTRACT

A management server and method for load balancing a cluster of host computers analyzes load metrics of clients naming on the host computers in the cluster to select a first client that can be migrated from a first host computer in the cluster to a second host computer in the cluster to improve load balance for the cluster and a second client running on the second host computer that can be swapped with the first client running on the first host computer for a client swapping operation. The client swapping operation involves simultaneously migrating the first client from the first host computer to the second host computer and migrating the second client from the second host computer to the first host computer.

21 Claims, 8 Drawing Sheets

LOAD BALANCING USING A CLIENT SWAPPING OPERATION

RELATED APPLICATIONS

Benefit is claimed under 35 U.S.C. 119(a)-(d) to Foreign application Serial No. 3208/CHE/2015 filed in India entitled "LOAD BALANCING USING A CLIENT SWAPPING OPERATION", on Jun. 25, 2015, by VMware, Inc., which is herein incorporated M its entirety by reference for all purposes.

BACKGROUND

Load balancing mechanisms for virtualized infrastructures, such as VMware vSphere® Distributed Resource Scheduler™, typically execute load balancing processes across a cluster of host computers or servers based on CPU and memory usage of virtual machines (VMs). When a load balancing mechanism detects an imbalance in the host cluster with respect to usage of these resources, the load, balancing mechanism tries to balance the host cluster by migrating or moving one or more VMs from highly loaded host computers to less loaded host: computers.

However, there are certain cases where a conventional load balancing mechanism may not be able to perform any migrations to improve the load balance in the cluster even though it may be possible to improve the load balance. An example would be a case where migrating a VM might improve the load balance in one metric (either CPU or memory) across the cluster, but that would worsen the load balance in the other metric, because load in the other metric is already well balanced across the cluster. This type of imbalance is called "single metric imbalance." In this case, the load balancing mechanism may not move that VM since such a VM migration may result in a greater overall imbalance. Another example would be a case where the load balancing mechanism has determined that a VM should be moved from a source host computer to a destination host computer to improve the load balance for the cluster, but the destination host computer already has a maximum number of VMs already running on that host computer. In this case, the load balancing mechanism would not move the VM to the destination host since that would exceed the maximum number of VMs set for the destination host computer.

SUMMARY

A management server and method for load balancing a duster of host computers analyzes load metrics of clients running on the host computers in the cluster to select a first client that can be migrated from a first host computer in the cluster to a second host computer in the cluster to improve load balance for the cluster and a second client running on the second host computer that can be swapped with the first, client running on the first host computer for a client swapping operation. The client swapping operation involves simultaneously migrating the first client from the first host computer to the second host computer and migrating the second client from the second host computer to the first host computer.

A method for load balancing a cluster of host computers in accordance with an embodiment of the invention comprises analyzing load metrics of clients running on the host computers in the cluster, selecting a first client that can be migrated from a first host computer in the cluster to a second host computer in the cluster to improve load balance for the cluster based on the analyzing of the load metrics of the clients, selecting a second client running on the second host computer that can be swapped with the first client running on the first host computer, and performing a client swapping operation that simultaneously migrate the first client from the first host computer to the second host computer and migrate the second client from the second host computer to the first host computer. In some embodiments, the steps of this method are performed when program instructions contained in a computer-readable storage medium is executed by one or more processors.

A management server in a distributed computer system with a cluster of host computers in accordance with an embodiment of the invention comprises a load balancing engine and a client migration module. The load balancing engine is configured to analyze load metrics of clients running on the host computers in the duster. The load balancing engine is further configured to select a first client that can be migrated from a first host computer in the cluster to a second host computer in the cluster to improve load balance for the cluster based on the analyzing of the load metrics of the clients and to select a second client running on the second host computer that can be swapped with the first client running on the first host computer. The client migration module is configured to perform a client swapping operation that simultaneously migrate the first client from the first host computer to the second host computer and migrate the second client from the second host computer to the first host computer.

Other aspects and advantages of embodiments of the present invention will become apparent from the following detailed description, taken in conjunction with the accompanying drawings, illustrated by way of ex ample of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
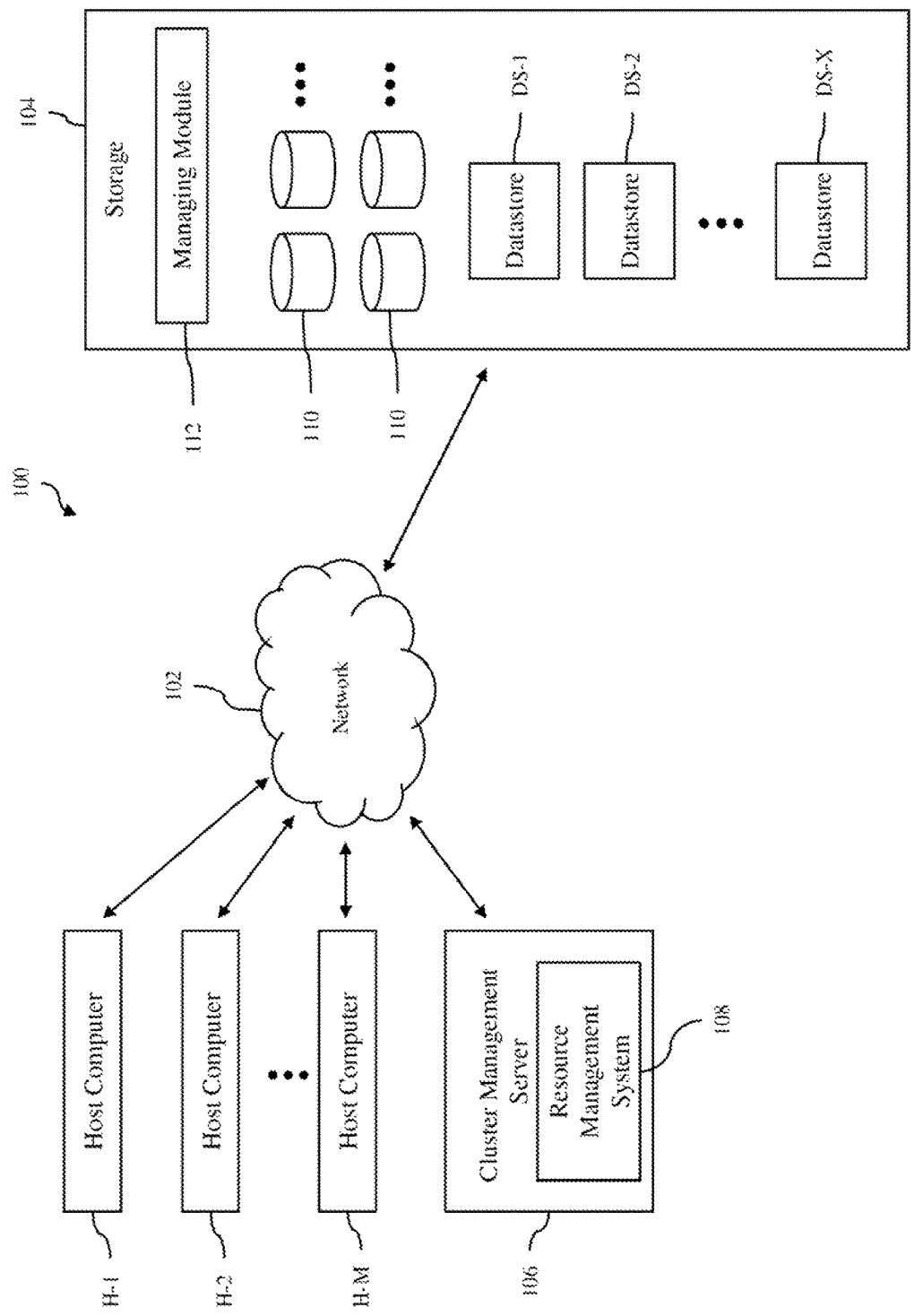
FIG. 1 is a block diagram of a distributed computer system in accordance with an embodiment of the invention.

Turning now to FIG. 1, a distributed computer system 100 that provides a computing environment in accordance with an embodiment of the invention is shown. The distributed computer system may be, for example, a computer network system. The distributed computer system can support a number of clients that can run various applications, such as large scale applications. As used herein, a large scale application is an application that requires multiple clients to run, such as a multi-tier application. An example of a multi-tier application is a web service application with a web tier, database tier and an application tier. As also used herein, "clients" refer to any software entities that can run on a computer system, such as software applications, software processes, virtual machines (VMs) and "containers" that provide system-level process isolation. As described in detail below, the distributed computer system includes a load balancing mechanism that can more efficiently execute load balancing processes for certain types of situations, such as "single metric imbalance" situations.

As illustrated in FIG. 1, the distributed computer system 100 includes a network 102, a cluster of host computers H-1, H-2, . . . H-M (where M is a positive integer), storage 104 and a cluster management server 106 with a resource management system 108. The host computers, the storage and the cluster management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that host or support one or more clients so that the clients are executing on the physical computer systems. As used herein, the term "client" is any software entity that can run on a computer system, such as a software application, a software process, a virtual machine (VM) and a "container" that provides system-level process isolation. The host computers may be servers that are commonly found in datacenters. As an example, the host computers may be servers installed in a single server rack. However, in other embodiments, the host computers may be installed in multiple server racks in the same or different facilities.

Figure 2:
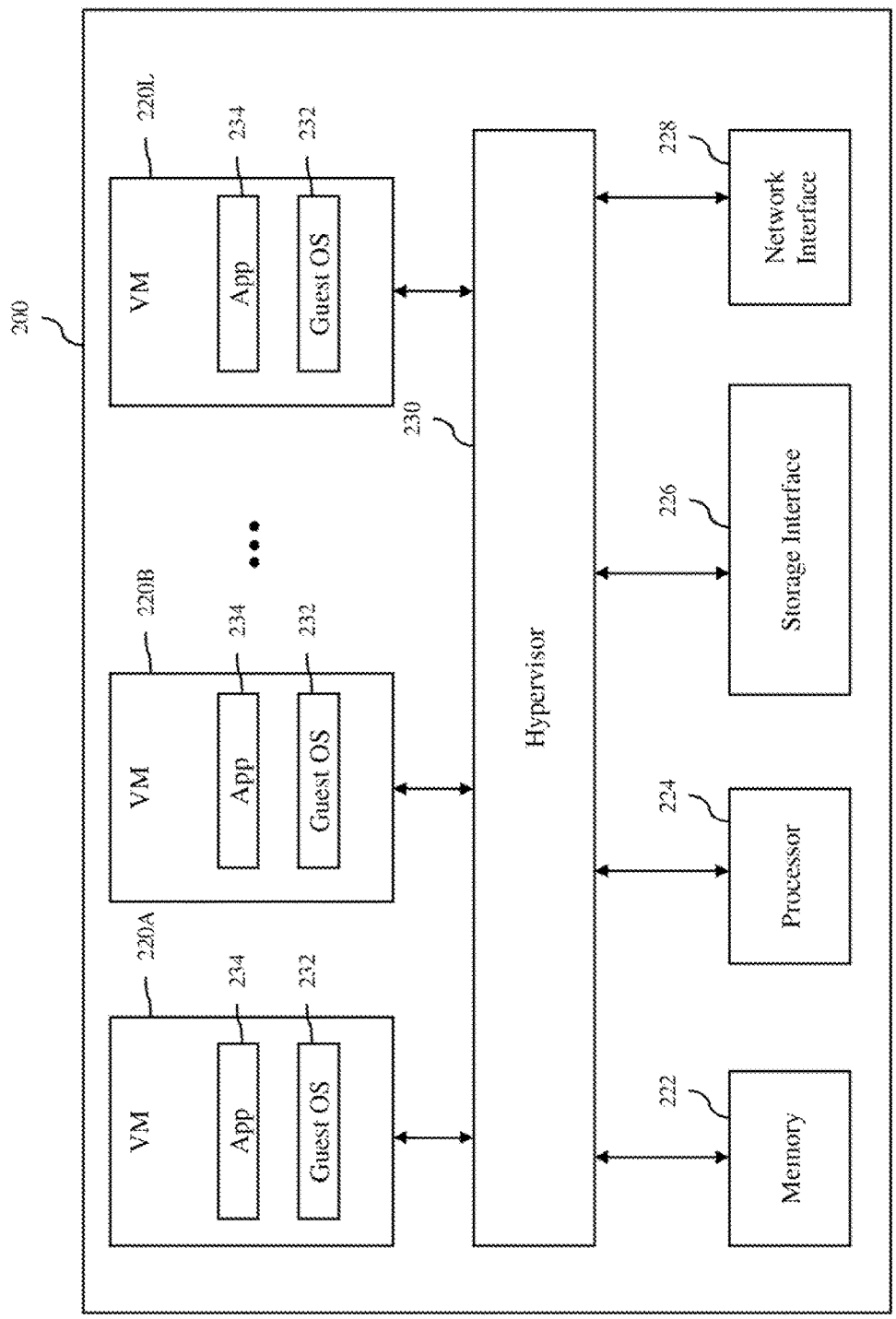
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by the hypervisor, and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

Turing back to FIG. 1, the network 102 can be any type of computer network or a combination of networks that allows communications between devices connected to the network. The network 102 may include the Internet, a wide area network (WAN), a local area network (LAN), a storage area network (SAN); a fibre channel network and/or other networks. The network 102 may be configured to support protocols suited for communications with storage arrays; such as Fibre Channel; Internet Small Computer System Interface (iSCSI), Fibre Channel over Ethernet (FCoE) and HyperSCSI.

The storage 104 is used to store data for the host computers H-1, H-2 . . . H-M, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1 DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-M. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cluster management server 106 operates to monitor and manage the host computers H-1, H-2 . . . H-M. The cluster management server may be configured to monitor the current configurations of the host computers and the clients running on the host computers, for example, virtual machines (VMS). The monitored configurations may include hardware configuration of each of the host computers, such as CPU type, multi-processor memory architecture and memory size, and/or software configurations of each of the host computers, such as operating system (OS) type and installed applications or software programs. The monitored configurations may also include client hosting information, i.e., which clients. e.g., VMs, are hosted or running, on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory; network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the cluster management server.

The cluster management server 106 may also perform operations to manage the clients and the host computers H-1, H-2 . . . H-M in the cluster. As illustrated in FIG. 1, in an embodiment, the cluster management server include the resource management system 108, which can be enabled by a user, to perform various resource management operations for the cluster, including load balancing operations, which may involve migrating one Or more clients from their host computers in the cluster to other host computers in the cluster. The resource management module is described in more detail below.

In some embodiments, the cluster management server 106 may be a physical computer. In other embodiments, the cluster management server may be implemented as one or more software programs running on one or more physical computers, such as the host computer 200 shown in FIG. 2, or virtual computers, such as the 220A, 220B . . . 220L, In an implementation, the cluster management server is a VMware vCenter™ server with at least some of the features available for such a server, and the resource management module 108 in the cluster management server is VMware vSphere™ Distributed Resource Scheduler™.

Figure 3:
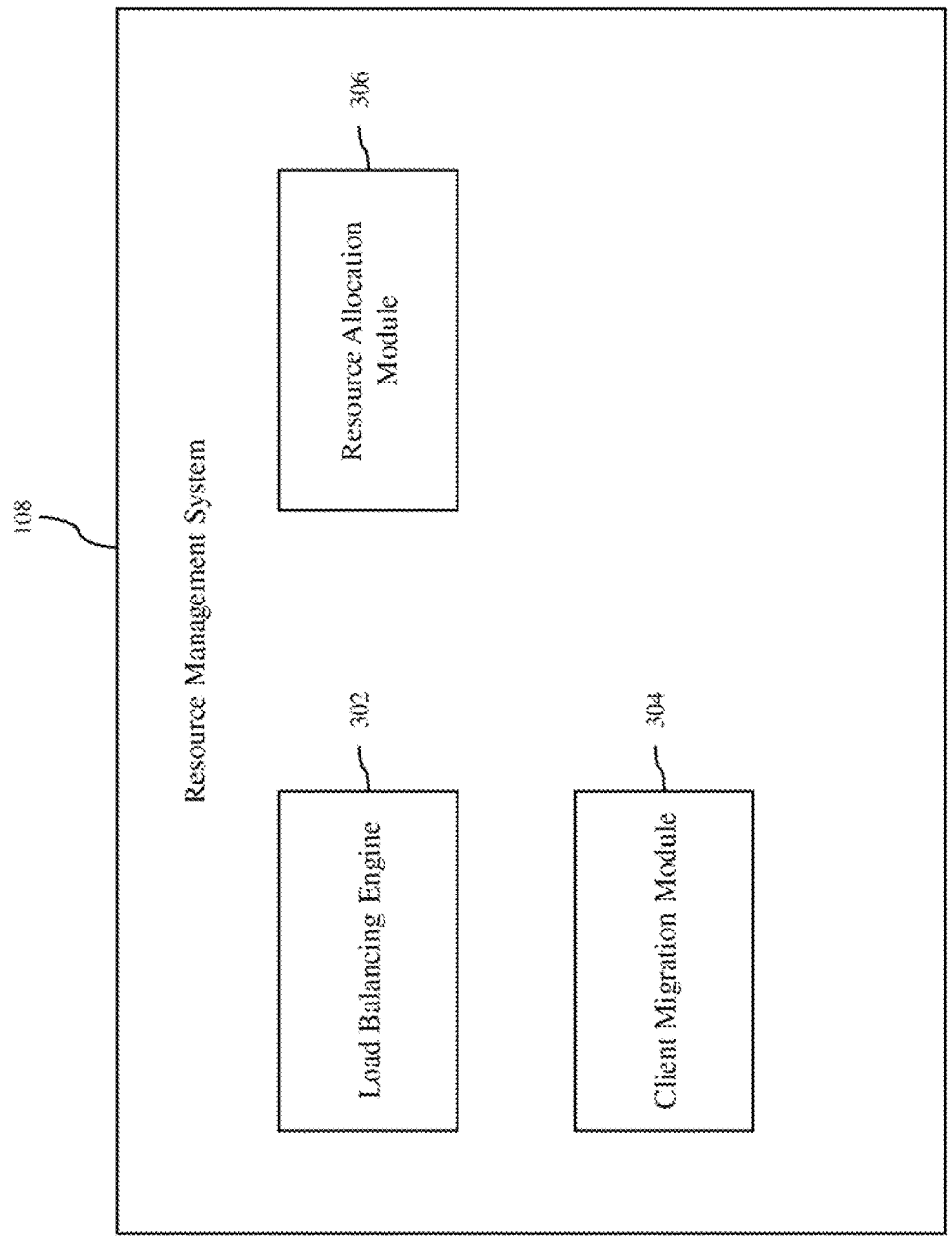
FIG. 3 is a block diagram illustrating components of a resource management system in accordance with an embodiment of the invention.

Turning now to FIG. 3, components of the resource management system 108 in accordance with an embodiment of the invention are shown. As illustrated in FIG. 3, the resource management system includes a load balancing engine 302 and a client migration module 304. These components of the resource management system operate to analyze load metrics for the clients running on the host computers in the cluster, make one or more client migration recommendations to improve load, balance and execute the client migration recommendations. As described in more detail below, in contrast to conventional load balancing mechanisms in which client migration recommendations are made to individually migrate one client at a time, the components of the resource management system allow for swapping of multiple clients that are running on different host computers. The swapping of multiple clients allows for improvements in load balance in certain situations that are not possible using conventional load balancing mechanisms, such as "single metric imbalance" situations.

The resource management system 108 may further include other components commonly found in a cluster resource management system, such as a resource allocation module 306 that distributes resources to various components in the cluster, such as clients and host computers, using various parameters such as reservation, limit and share values. Since the resource allocation module is a commonly found element, it is not described herein in detail. In a particular implementation, the resource allocation module may be a component found in VMware vSphere® Distributed Resource Scheduler™. The components of the resource management system may be implemented in any combination of hardware, software and firmware. In one implementation, these components of the resource management systems are implemented as one or more software programs running in the cluster management server 106 using one or more processors associated with the cluster management server.

The load balancing engine 302 operates to analyze load metrics for the clients running on the host computers H-1, H-2 ... H-M in the cluster to make one or more client migration recommendations to improve the load balance with respect to the clients. The client migration recommendations may include a recommendation to swap multiple clients running on different host computers. The load metrics analyzed by the load balancing engine may include resource usage information of the clients running on the host computers in the cluster and resource capacities of the host computers for various resources, such as CPU and memory. In some embodiments, the load balancing engine receives the load metrics from the host computers H-1, H-2 ... H-M, e.g., the hypervisors 230 of the host computers, when needed, for example, when the load balancing engine is initiated at predefined intervals, e.g., every 5 minutes. Using the received load metrics, the load balancing engine determines if changes in the distribution of the clients among the host computers in the cluster would improve the load balance of the cluster. Based on the analysis, the load balancing engine generates client migration recommendations that would improve the load balance in the cluster. Unlike conventional load balancing mechanisms, the load balancing engine can generate client migration recommendations in which multiple clients running on different host computers are recommended to be swapped. For example, in certain situations, the load balancing engine may recommend swapping two clients running on two different host computers. In other situations, the load balancing engine may recommend swapping more than two clients running on two or more host computers.

The client migration recommendations generated by the load balancing engine 302 may be implemented either automatically or manually, which may be a setting that can be controlled by a user, such as an administrator. For the automatic setting, the client migration recommendations are automatically implemented by the client migration module 304. For the manual setting, the client migration recommendations are only implemented by the client migration module after the client migrations recommendations are presented to the user and then approved for implementation by the user.

The client migration module 304 operates to implement client migrations specified in the client migration recommendations generated by the load balancing engine 302. The client migration module executes or controls various operations to migrate one or more clients from source or originating host computers to target or destination host computers. In some embodiments, other components in the distributed computer system 100 are called to execute some or all of the operations involved in client migrations. In an embodiment, the client migration module may utilize vMotion technology of VMware, Inc. to execute live migration of one or more clients. In an embodiment, for client migrations that involve swapping client between host computers, the swapping of the clients is executed as an atomic operation. That is, the client migration module performs the client swapping operation in an indivisible manner such that all the clients being migrated are either successfully migrated to their destination host computers or all the clients being migrated are returned to their source host computers if the client swapping operation is not fully successful. The client swapping operation involves simultaneously migrating the selected clients and then stunning or temporarily suspending the clients after all the clients have been migrated to their destination host computers to register the clients on their respective destination host computers.

The client swapping operation implemented by the client migration module 304 in accordance with an embodiment of the invention is now described using an example of two clients, VM1 and VM2, running on two host computers. Host1 and Host2, respectively, being swapped. The client swapping operation begins by creating a shadow VM for each of the VMs being swapped on the respective destination host computer. In this example, a shadow VM for VM1 will be created on Host2 and a shadow VM for VM2 will be created on Host1. Initially, a shadow VM is an exact copy of an original VM being shadowed without access to the original or copy of the memory data of the original VM. For each VM being swapped, the memory data is copied from the source host computer to the destination host computer and associated with the respective shadow VM. In a particular implementation, each memory page is copied from the source host computer to the destination host computer, which is known as a pre copy process. Thus, each memory page of VM1 is copied from Host1 to Host2 and each memory page of VM2 is copied from Host2 to Host 1. After the initial iteration of the pre-copy process, the pre-copy process is repeated, copying any pages that changed during the previous iteration, until no changed pages remain.

After the memory data for both VM1 and VM2 has been copied to the destination hosts, VM1 and VM2 are stunned or momentarily quiesced and resumed at their destination hosts via the respective shadow VMs. This step is performed only when the last VM is done copying its data, which typically will be the larger VM. So in general, the migration time of a single client swapping operation of VM1 and VM2 will be:

$$\text{MAX(migration time of VM1, migration time of VM2)}.$$

The client swapping operation allows the resource management system 108 to more effectively improve the load balance in the cluster in certain situations. A few of these situations will be described below, although there are other situations that may benefit from client swapping operations performed by the resource management system.

In a first situation, the client swapping operation allows the resource management system 108 to better handle "single metric imbalance" situations, which will be described using an example illustrated in FIG. 4A. In this example, there are two host computers, Host1 and Host2, in a cluster. Host1 currently includes five VMs, VM1, VM2, VM3, VM4 and VM5. Host2 currently also includes five VMs, VM6, VM7, VM8, VM9 and VM10. For this example, let's assume that there are two metrics being considered for load balancing, e.g., CPU and memory. The current state of the cluster shown in FIG. 4A is imbalanced with respect to one of the two metrics, e.g., CPU, and not imbalanced with respect to the other metric, e.g., memory, and thus, this cluster is currently single metric imbalanced.

In an embodiment, the overall cluster imbalance is a factor of the imbalance in both of these metrics. Thus, the cluster shown in FIG. 4A will be considered to be imbalanced as a whole. In this case, trying to balance out the imbalance in one Unbalanced metric, i.e., CPU, by migrating one or more VMs may eventually result in an imbalance in the other metric, i.e., memory. Thus, conventional load balancing mechanisms may decide not to make any migration moves in such cases, leaving the cluster imbalanced.

The resource management system 108 is able to execute one or more client swapping operations in order to improve the load balance of the cluster without creating any imbalance in the already balanced metric, i.e., memory. In order to handle the single metric imbalance of the cluster, the load balancing engine 302 will select a highly loaded VM in terms of the Unbalanced metric, i.e., CPU, from one of Host1 and Host2, and also select a lightly loaded VM in terms of the imbalanced metric, i.e., CPU, from the other host computer, both of which have similar balanced metric usage. In selecting these VMs, the load balancing engine has determined that selecting the highly loaded VM in terms of CPU will create imbalance or reduce the balance in terms of memory. Thus, the load balancing engine has determined that selecting the lightly loaded VM in terms of CPU will compensate or improve the load balance in terms of memory when the other highly loaded VM has migrated.

Figure 4A:
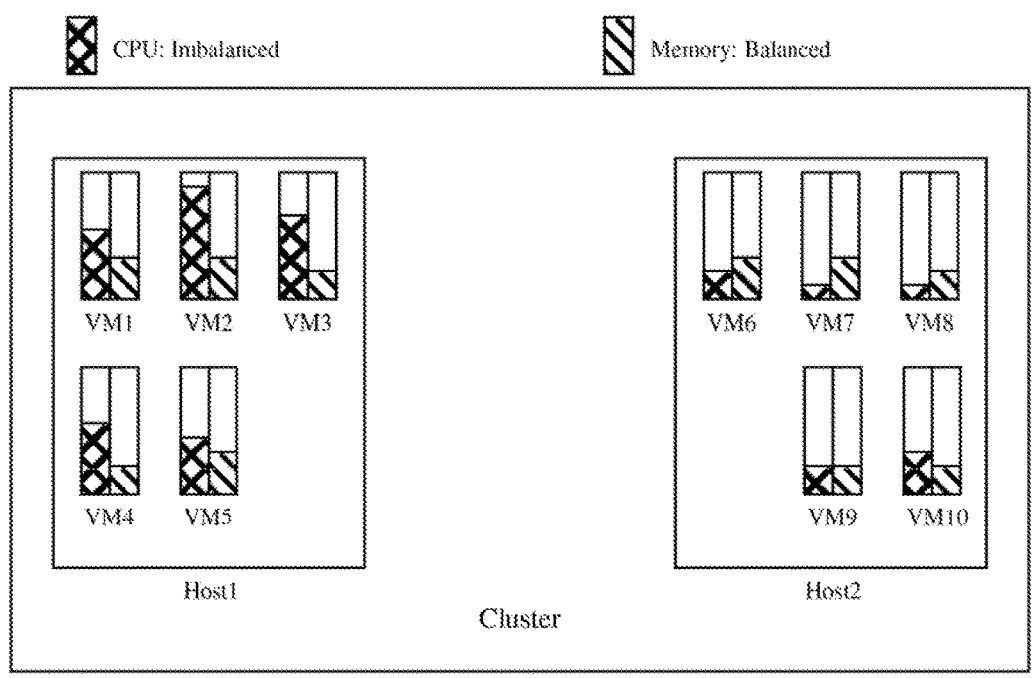
FIGS. 4A, 4B and 4C illustrate a client swapping operation performed on a cluster of host computers for a single metric imbalance situation in accordance with an embodiment of the invention.

In the example illustrated in FIG. 4A, let's assume that VM2 on Host1 is a highly loaded VM with respect to the imbalanced metric, i.e., CPU. Thus, migrating VM2 from Host1 to Host2 would reduce the imbalance with respect to CPU, but would create imbalance with respect to the balanced metric, i.e., memory. Let's also assume that VM7 on Host2 is a lightly loaded VM with respect to the imbalanced metric, i.e., CPU, but has similar usage with respect to the balanced metric, i.e., memory, as that of VM2. In this example, a conventional load balancing mechanism would not move VM2 from Host1 to Host2 since that would create imbalance with respect to memory, even though the migration would reduce the imbalance with respect to CPU. However, in this example, the load balancing engine 302 of the resource management system 108 will select VM2 on Host1 and VM7 on Host2 to be swapped.

Figure 4B:
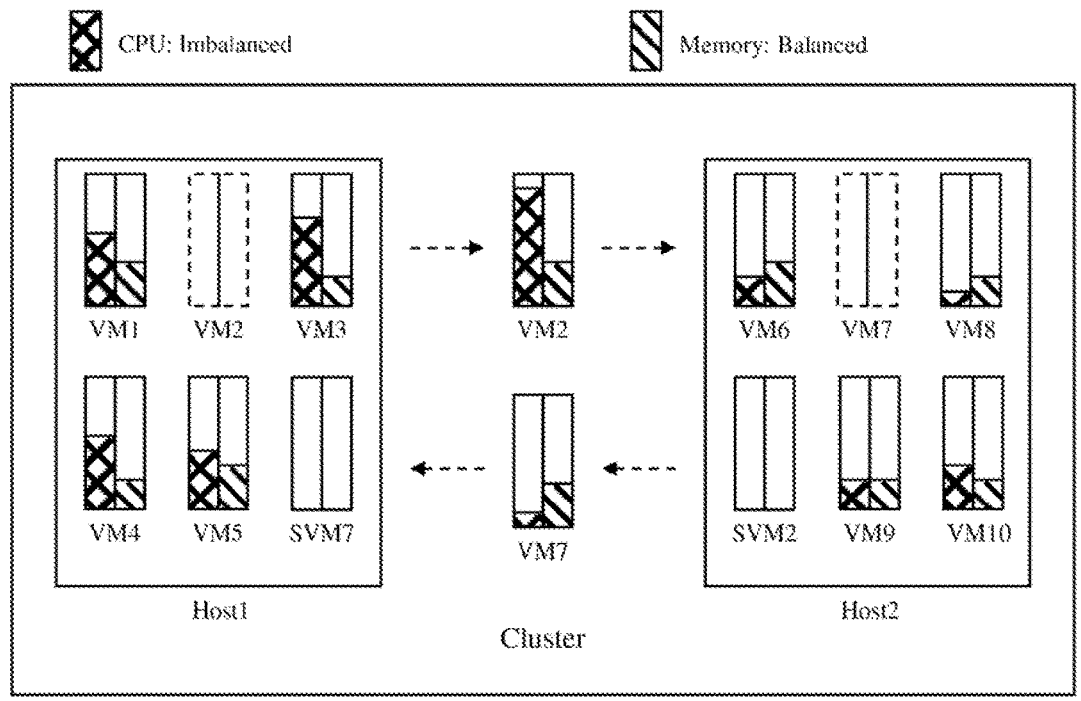

FIG. 4B illustrates the cluster of host computers during the client swapping operation performed by the resource management system 108 in accordance with an embodiment of the invention. As shown in FIG. 4B, VM2 on Host1 is being swapped with VM7 on Host2. Thus, VM2 on Host1 and VM7 on Host2 are illustrated with dotted boxed to illustrate that these VMs are in migration state. In addition, a shadow VM ("SVM2") of VM2 is created on Host2 and a shadow VM ("SVM7") of VM7 is created on Host1.

Figure 4C:
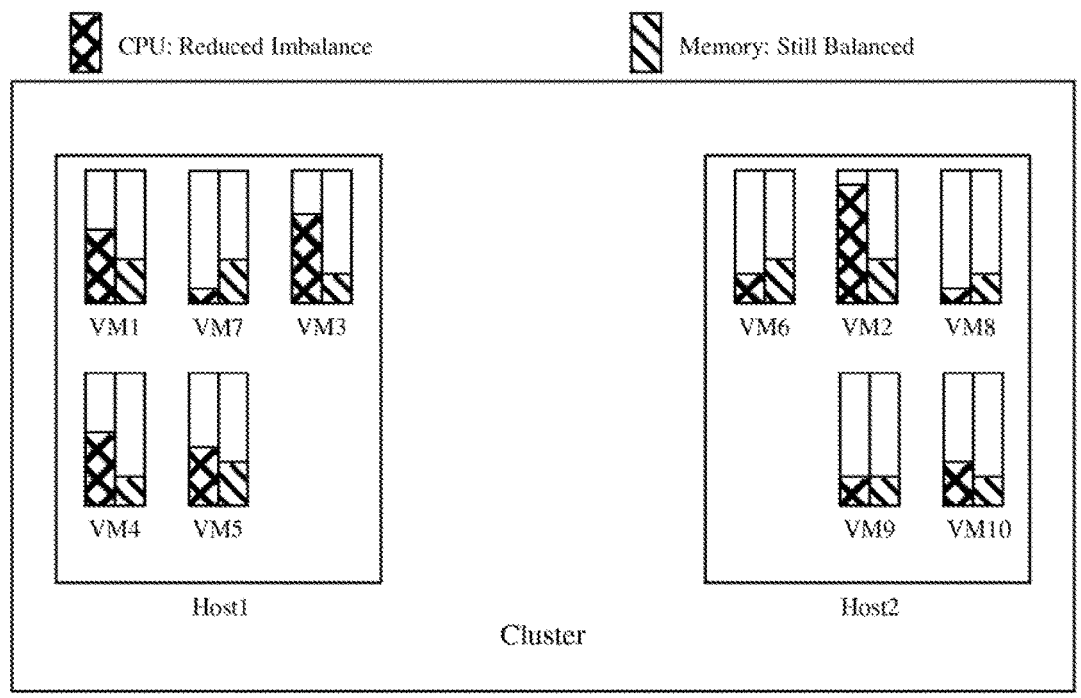

FIG. 4C illustrates the cluster of host computers after the client swapping operation. As shown in FIG. 4C, VM2 is now on Host2 and VM7 is now on Host1. As a result, the imbalance of cluster with respect to CPU has been reduced. However, since VM2 and VM7 have swapped, the cluster is still balanced with respect to memory. Thus, the overall load balance of the cluster has been improved.

In a second situation; the client swapping operation allows the resource management system 108 to facilitate a migration of a client to a host computer that is currently at its maximum with respect to the number of clients that the host computer is allowed to support or register (referred to herein as a "maximum client limit" situation), which will be described using an example illustrated in FIG. 5A, In this example. Host1 currently includes five VMs, VM1, VM2, VM3, VM4 and VM5, and Host2 currently includes eight. VMs, VM6, VM7, VM8, VM9, VM10, VM11, VM12 and VM13. Similar to the previous example, there are two metrics being considered for load balancing, e.g., CPU and memory. The current state of the cluster shown in FIG. 5A is imbalanced with respect to at least one of the two metrics, e.g., CPU.

In some clusters, the maximum number of clients that a host computer can support is predefined as a setting, which may be set by a user or an administrator. In a VMware cluster, this setting, is called MaxSupportedVms. In the example illustrated in FIG. 5A, the maximum number of clients that Host2 can support is eight, e.g., MaxSupportedVms=8, and the maximum number of clients that Host1 can support is greater than five. e.g., MaxSupportedVms>8, Let's assume that moving VM2 from Host1 to Host 2 will improve the load balance for the cluster. However, conventional load balancing mechanisms would not move a VM to a destination host that currently supports the predefined maximum number of clients, for example, as set by the MaxSupportedVms value. Thus, in the cluster state illustrated in FIG. 5A, a conventional load balancing mechanism would not move VM2 from Host1 to Host 2.

The resource management system 108 is able to execute one or more client swapping operations in order to improve the load balance of the cluster even though one of the destination host computer is currently supporting clients at its predefined maximum number of clients. In an embodiment, the load balancing engine 302 will select a highly loaded VM in terms of the imbalanced metric, e.g., CPU, from one of Host1 and Host2, and also select a lightly loaded VM in terms of the imbalanced metric, e.g., CPU, from the other host computer. The selection of the lightly loaded VM1 may be made to ensure that any other balanced metric is not adversely affected by the swapping of the two VMs, i.e., create imbalance with respect to the balanced metric.

Figure 5A:
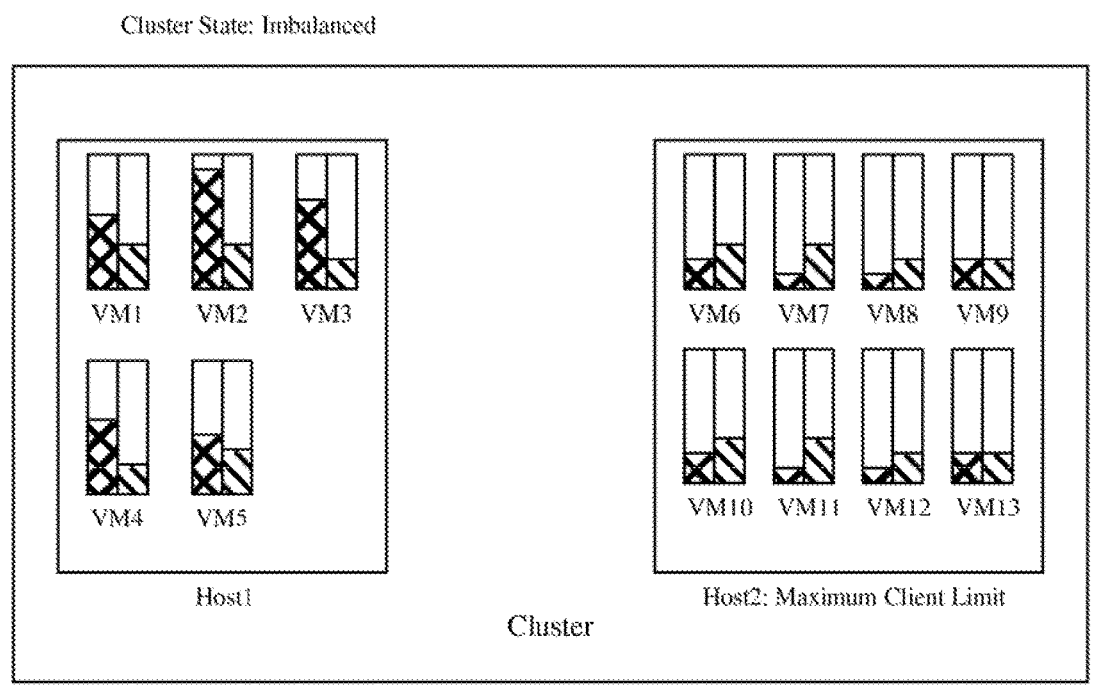
FIGS. 5A, 5B and 5C illustrate a client swapping operation performed on a cluster of host computers for a maximum client limit situation in accordance with an embodiment of the invention.

In the example illustrated in FIG. 5A, let's assume that VM2 on Host1 is a highly loaded VM with respect to the imbalanced metric, i.e., CPU. Thus, migrating VM2 from Host1 to Host2 would reduce the imbalance with respect to CPU. Let's also assume that VM7 on Host2 is a lightly loaded VM with respect to the imbalanced metric, i.e., CPU. In this example, as explained above, a conventional load balancing mechanism would not move VM2 from Host1 to Host2 since that would exceed the predefined maximum number of clients that Host2 can support. However, in this example, the load balancing engine 302 of the resource management system 108 will select VM2 on Host1 and VM7 on Host2 to be swapped.

Figure 5B:
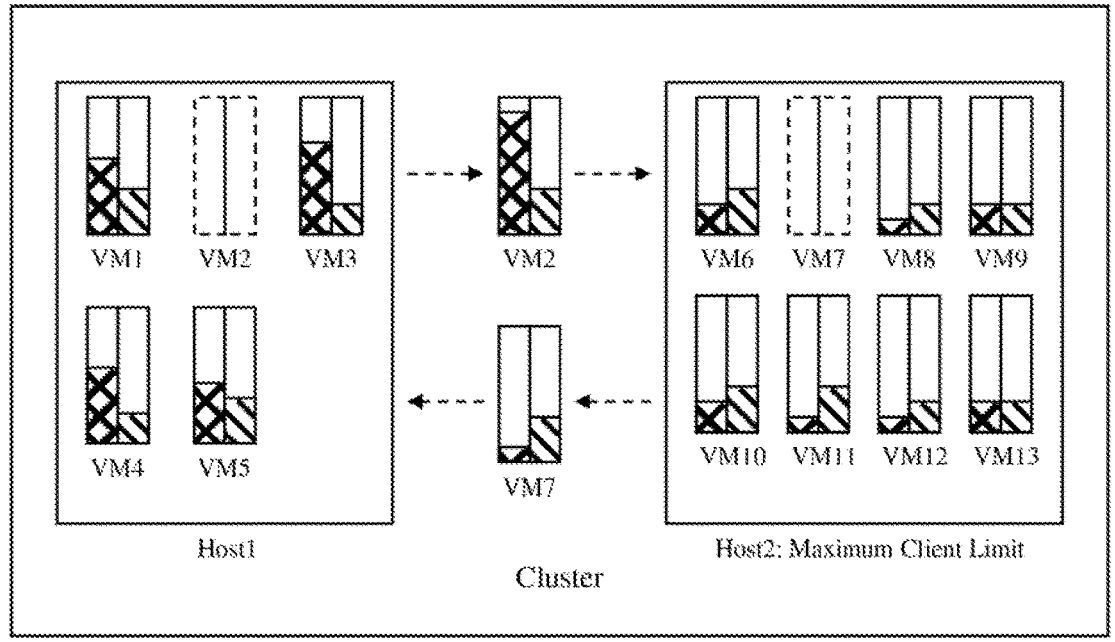

FIG. 5B illustrates the cluster of host computers during the client swapping operation performed by the resource management system 108 in accordance with an embodiment of the invention. As shown in FIG. 5B, VM2 on Host1 is being swapped with VM7 on Host2. Thus, VM2 on Host1 and VM7 on Host2 are illustrated with dotted boxes to illustrate that these VMs are in migration state. Although not illustrated, a shadow VM of VM2 is created on Host2 and a shadow VM of VM7 is created on Host1. In some embodiments, the predefined maximum number of clients that Host2 can support may be temporarily overridden so that VM2 can be migrated to Host2.

Figure 5C:
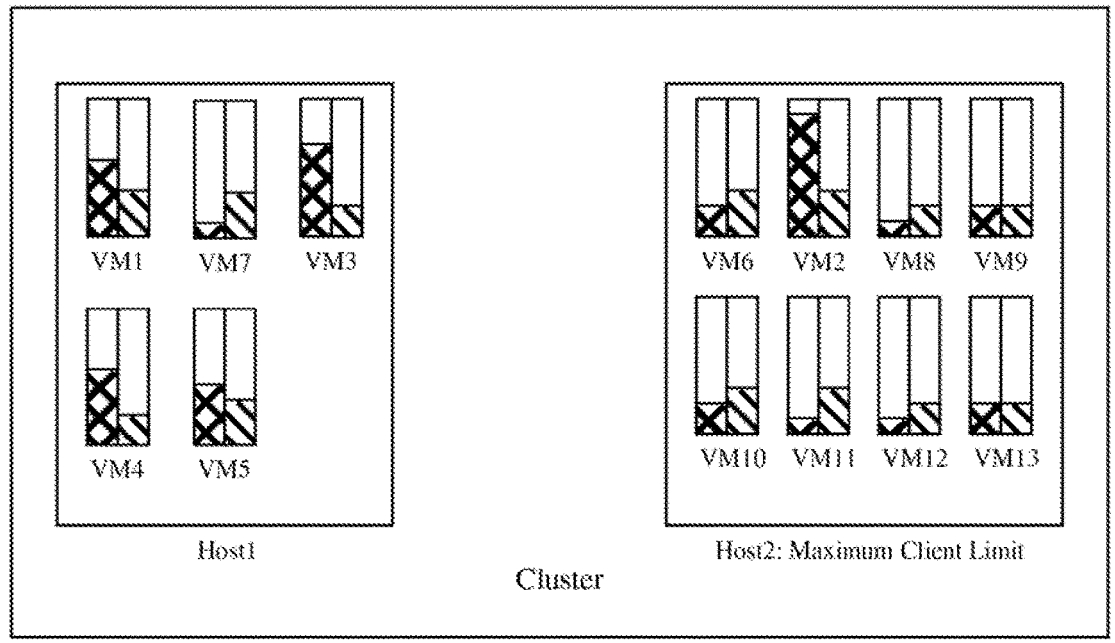

FIG. 5C illustrates the cluster of host computers after the client swapping operation. As shown in FIG. 5C, VM2 is now on Host2 and VM7 is now on Host1, As a result the load balance of cluster has been improved by migrating VM2 to Host2 even though the number of VMs that were being supported by Host2 was at its predefined maximum number of clients by swapping VM2 on Host1 with VM7 on Host2.

The use of one or more swapping operations may also be used even in situations in which both the source and destination hosts are currently supporting clients at their respective predefined maximum number of clients. This situation is similar to the second situation described above with respect to FIGS. 5A-5C. However, in this situation, both Host1 and Host2 are supporting VMs at their respective maximum of VMs, which does not affect the client swapping operation performed by the resource management module 108 that would improve the load balance of the cluster.

As described above with respect to different cluster state situations, the resource management module 108 is able to perform one or more client swapping operations to improve the load balance of the cluster in situations in which convention load balancing mechanism are unable to improve.

Although the examples described herein involve performing a client swapping operation for two clients (i.e., VMs) on two different host computers, the resource management module may perform client swapping operations for more than two clients on two or more host computers to improve the load balance of a cluster.

Figure 6:
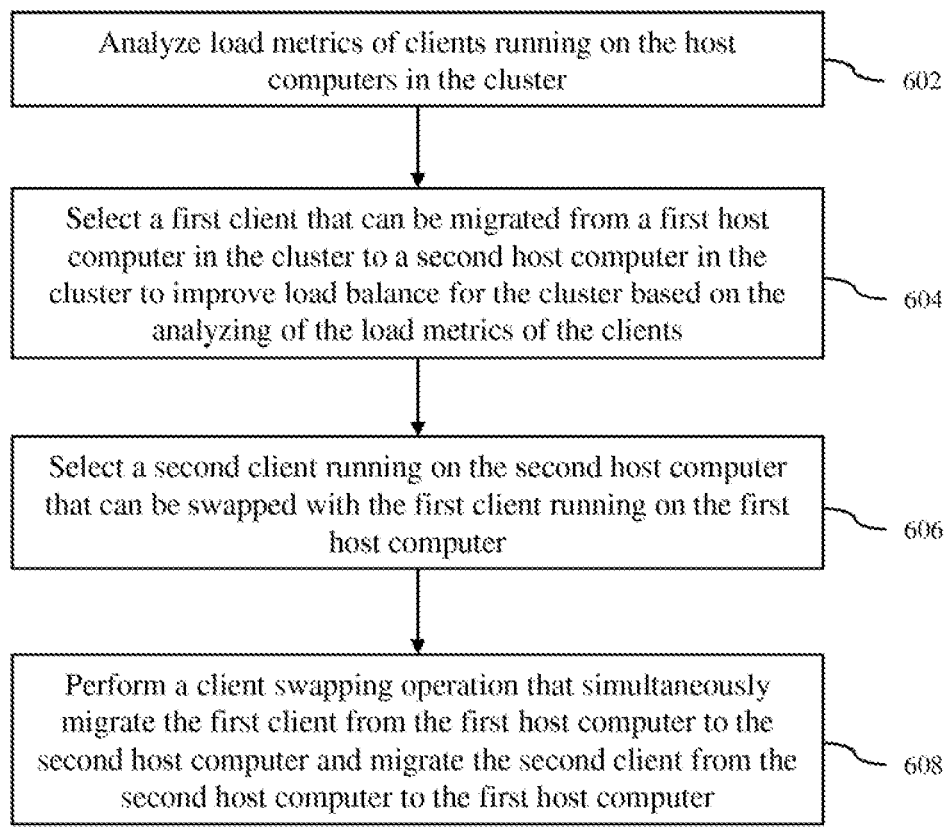
FIG. 6 is a flow diagram of a method for load balancing a cluster of host computer in accordance with an embodiment of the invention.

A method for load balancing a cluster of host computers in accordance with an embodiment of the invention is now described with reference to the process flow diagram of FIG. 6. At block 602, load metrics of clients running on the host computers in the cluster are analyzed. The load metrics may include usage information of various resources that can be considered for load balancing, such as CPU and memory. At block 604, a first client that can be migrated from a first host computer in the cluster to a second host computer in the cluster to improve load balance for the cluster is selected based on the analysis of the load metrics of the clients. At block 606, a second client running on the second host computer that can be swapped with the first client running on the first host computer is selected. At block 608, a client swapping operation that simultaneously migrate the first client from the first host computer to the second host computer and migrate the second client, from the second host computer to the first host computer is performed.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the from of a computer program product accessible from a computer-usable or computer readable medium providing program code for use by or in connection with a computer or any instruction execution system. For the purposes of this description, a computer-usable or computer readable medium can be any apparatus that can contain, store, communicate; propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory; magnetic tape, a removable computer diskette, a random access memory (RAM), a read-only memory (ROM), a rigid magnetic disc, and an optical disc. Current examples of optic discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for load balancing a cluster of host computers, the method comprising:
    analyzing load metrics of clients running on the host computers in the cluster;
    selecting a first client that can be migrated from a first host computer in the cluster to a second host computer in the cluster to improve load balance for the cluster based on the analyzing of the load metrics of the clients;
    selecting a second client running on the second host computer that can be swapped with the first client running on the first host computer; and
    performing a client swapping operation that simultaneously migrate the first client from the first host computer to the second host computer and migrate the second client from the second host computer to the first host computer,
    wherein the client swapping operation is an atomic operation performed in an indivisible manner such that both the first and second clients being migrated are returned to their source host computers if the client swapping operation is not fully successful.

2. The method of claim 1, wherein the selecting the first client includes determining that migrating the first client from the first host computer to the second host computer would improve load balance with respect to one resource usage metric but would reduce load balance with respect to another resource usage metric.

3. The method of claim 2, wherein the selecting the second client includes determining that migrating the second client from the second host computer to the first host computer would improve the load balance with respect to the another resource usage metric when the first client is migrated from the first host computer to the second host computer.

4. The method of claim 1, wherein the second host computer is supporting a maximum number of clients allowed for the second host computer when the load metrics of the clients are analyzed.

5. The method of claim 4, wherein the first host computer is supporting a maximum number of clients allowed for the first host computer when the load metrics of the clients are analyzed.

6. The method of claim 4, wherein the maximum number of clients allowed for the second host computer is defined by a setting for the second host computer.

7. The method of claim 1, wherein the performing of the client swapping operation comprises:
    creating a first shadow client for the first client on the second host computer;
    creating a second shadow client for the second client on the first host computer;
    copying memory data of the first client from the first host computer to the second host computer;
    copying memory data of the second client from the second host computer to the first host computer;
    after copying of the memory data for both first and second clients has been completed, stunning the first and second clients and resuming the first and second clients at their destination host computers using the first and second shadow clients, respectively.

8. The method of claim 7, wherein the copying the memory data of the first client includes executing a plurality of iterations of a pre-copy process, wherein a first iteration includes copying each memory page of the first client from the first host computer to the second host computer and wherein a subsequent iteration includes copying each memory page of the first client that has been changed from a previous iteration from the first host computer to the second host computer.

9. A non-transitory computer-readable storage medium containing program instructions for a method for load balancing a cluster of host computers, wherein execution of the program instructions by one or more processors of a computer system causes the one or more processors to perform steps comprising:
analyzing load metrics of clients running on the host computers in the cluster;
selecting a first client that can be migrated from a first host computer in the cluster to a second host computer in the cluster to improve load balance for the cluster based on the analyzing of the load metrics of the clients;
selecting a second client running on the second host computer that can be swapped with the first client running on the first host computer; and
performing a client swapping operation that simultaneously migrate the first client from the first host computer to the second host computer and migrate the second client from the second host computer to the first host computer,
wherein the client swapping operation is an atomic operation performed in an indivisible manner such that both the first and second clients being migrated are returned to their source host computers if the client swapping operation is not fully successful.

10. The computer-readable storage medium of claim 9, wherein the selecting the first client includes determining that migrating the first client from the first host computer to the second host computer would improve load balance with respect to one resource usage metric but would reduce load balance with respect to another resource usage metric.

11. The computer-readable storage medium of claim 10, wherein the selecting the second client includes determining that migrating the second client from the second host computer to the first host computer would improve the load balance with respect to the another resource usage metric when the first client is migrated from the first host computer to the second host computer.

12. The computer-readable storage medium of claim 9, wherein the second host computer is supporting a maximum number of clients allowed for the second host computer when the load metrics of the clients are analyzed.

13. The computer-readable storage medium of claim 12, wherein the first host computer is supporting a maximum number of clients allowed for the first host computer when the load metrics of the clients are analyzed.

14. The computer-readable storage medium of claim 12, wherein the maximum number of clients allowed for the second host computer is defined by a setting for the second host computer.

15. The computer-readable storage medium of claim 9, wherein the performing of the client swapping operation comprises:
creating a first shadow client for the first client on the second host computer;
creating a second shadow client for the second client on the first host computer;
copying memory data of the first client from the first host computer to the second host computer;
copying memory data of the second client from the second host computer to the first host computer;
after copying of the memory data for both first and second clients has been completed, stunning the first and second clients and resuming the first and second clients at their destination host computers using the first and second shadow clients, respectively.

16. The computer-readable storage medium of claim 15, wherein the copying the memory data of the first client includes executing a plurality of iterations of a pre-copy process, wherein a first iteration includes copying each memory page of the first client from the first host computer to the second host computer and wherein a subsequent iteration includes copying each memory page of the first client that has been changed from a previous iteration from the first host computer to the second host computer.

17. A management server in a distributed computer system with a cluster of host computers, the management server comprising:
memory; and
a processor configured to:
analyze load metrics of clients running on the host computers in the cluster;
select a first client that can be migrated from a first host computer in the cluster to a second host computer in the cluster to improve load balance for the cluster based on the analyzing of the load metrics of the clients;
select a second client running on the second host computer that can be swapped with the first client running on the first host computer; and
perform a client swapping operation that simultaneously migrate the first client from the first host computer to the second host computer and migrate the second client from the second host computer to the first host compute,
wherein the client swapping operation performed by the client migration module is an atomic operation performed in an indivisible manner such that both the first and second clients being migrated are returned to their source host computers if the client swapping operation is not fully successful.

18. The management server of claim 17, wherein the processor is further configured to determine that migrating the first client from the first host computer to the second host computer would improve load balance with respect to one resource usage metric but would reduce load balance with respect to another resource usage metric.

19. The management server of claim 18, wherein the processor is further configured to determine that migrating the second client from the second host computer to the first host computer would improve the load balance with respect to the another resource usage metric when the first client is migrated from the first host computer to the second host computer.

20. The management server of claim 17, wherein at least one of the first and second host computers is supporting a maximum number of clients allowed for that host computer when the load metrics of the clients are analyzed.

21. The management server of claim 17, wherein the processor is further configured to:
create a first shadow client for the first client on the second host computer;

create a second shadow client for the second client on the first host computer;
copy memory data of the first client from the first host computer to the second host computer;
copy memory data of the second client from the second host computer to the first host computer; and
after the memory data for both first and second clients has been copied, stun the first and second clients and resume the first and second clients at their destination host computers using the first and second shadow clients, respectively.

\* \* \* \* \*